US00RE46717E

(19) United States
(12) Reissued Patent
Piretti

(10) Patent Number: US RE46,717 E
(45) Date of Reissued Patent: Feb. 20, 2018

(54) CHAIR WITH A PIVOTING BACKREST

(71) Applicant: PRO-CORD S.p.A., Bologna (IT)

(72) Inventor: Giancarlo Piretti, Bologna (IT)

(73) Assignee: PRO-CORD S.p.A., Bologna (IT)

(21) Appl. No.: 14/984,863

(22) Filed: Dec. 30, 2015

Related U.S. Patent Documents

Reissue of:
(64) Patent No.: 8,998,321
Issued: Apr. 7, 2015
Appl. No.: 14/275,695
Filed: May 12, 2014

(30) Foreign Application Priority Data

Jul. 31, 2013 (IT) ..... TO2013A0650

(51) Int. Cl.
*B60N 2/02* (2006.01)
*A47C 7/44* (2006.01)

(52) U.S. Cl.
CPC ..... *A47C 7/443* (2013.01); *A47C 7/44* (2013.01)

(58) Field of Classification Search
CPC .. A47C 7/40; A47C 7/44; A47C 7/441; A47C 7/443; A47C 7/448; A47C 7/48
See application file for complete search history.

(56) References Cited

U.S. PATENT DOCUMENTS 1,926,259 A * 9/1933 Bitzenburger ..... B60N 2/34 297/301.4
3,720,396 A * 3/1973 Gilbert ..... A47C 7/443 248/578
4,084,850 A 4/1978 Ambasz
4,157,203 A * 6/1979 Ambasz ..... 297/300.5
4,858,993 A * 8/1989 Steinmann ..... A47C 1/026 297/302.4
4,869,552 A * 9/1989 Tolleson et al. ..... A47C 7/445 248/160
5,108,149 A 4/1992 Ambasz ..... A47C 7/443 297/297
5,944,382 A 8/1999 Ambasz
2008/0252124 A1* 10/2008 Chen ..... A47C 7/443 297/301.4

FOREIGN PATENT DOCUMENTS

EP 2183997 A1 5/2010

OTHER PUBLICATIONS

Italian Search Report and Written Opinion for Application No. T02013A000650 dated Mar. 7, 2014.

* cited by examiner

*Primary Examiner* — Patricia Engle
(74) *Attorney, Agent, or Firm* — Patterson & Sheridan, LLP

(57) ABSTRACT

A chair having a fixed support structure including two side uprights, a backrest having two side portions, and a pair of elastic joints connecting said side portions of the backrest to said side uprights, wherein each of said elastic joints comprises: a bushing fixed to a respective side upright, a helical spring having a longitudinal axis, the helical spring having an upper end resting against a front wall of the bushing, a compression member resting against a lower end of the spring, an upper attachment fixed to a corresponding side portion of the backrest, and a rigid connecting rod having an upper end and a lower end.

5 Claims, 4 Drawing Sheets

10
20
14
18
22
30
28
24
26
16
12

10
20
14
18
III
30
22
28
24
26
16
12

CHAIR WITH A PIVOTING BACKREST

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims benefit of Italian patent application number TO2013A000650, filed Jul. 31, 2013, which is herein incorporated by reference.

BACKGROUND OF THE INVENTION

1. Field of the Invention

The present invention relates to a chair with a pivoting backrest capable of tilting backwards under a thrust applied by the user's back.

2. Description of Prior Art

In the state of the art, there are various known solutions of chairs in which the backrest is connected to a fixed support structure by a pair of elastic joints, each of which comprises an upper support inserted into a tubular portion of the backrest, a lower support inserted into a tubular element of the fixed support structure and an elastic element, which allows an inclination between the upper support and the lower support.

For example, the document EP2183997 of the same applicant describes a chair comprising a base structure including two rear tubular elements, a backrest having two tubular portions and two elastic devices, each of which has an upper support inserted into a tubular portion of the backrest, a lower support inserted into the corresponding tubular element of the base structure and an elastic element deformable by bending to allow pivoting between the upper support and the lower support, wherein each of the elastic devices comprises a plurality of stacked sectors, arranged between the upper support and the lower support.

The elastic elements that are deformable by bending have the drawback of a limited elastic force for opposing the backward thrust applied by the user.

In principle, with elastic elements in compression formed, for example, by helical compression springs, it would be possible to increase the force provided by the elastic joints that contrast the backward thrust applied by the user on the backrest of the chair. However, with helical compression springs arranged coaxially to the side uprights of the backrest, the lever arm for the compression of the springs is limited.

SUMMARY OF THE INVENTION

The present invention aims to provide a chair with a pivoting backrest equipped with simple and robust elastic joints, capable of providing a high elastic force that counteracts the backward thrust applied by the user on the backrest of the chair.

According to the present invention, this object is achieved by a chair having the characteristics forming the subject of claim 1.

The claims form an integral part of the disclosure provided in relation to the invention.

BRIEF DESCRIPTION OF THE DRAWINGS

The present invention will now be described in detail with reference to the accompanying drawings, given purely by way of non-limiting example, wherein.

DETAILED DESCRIPTION

Figures 1, 2:
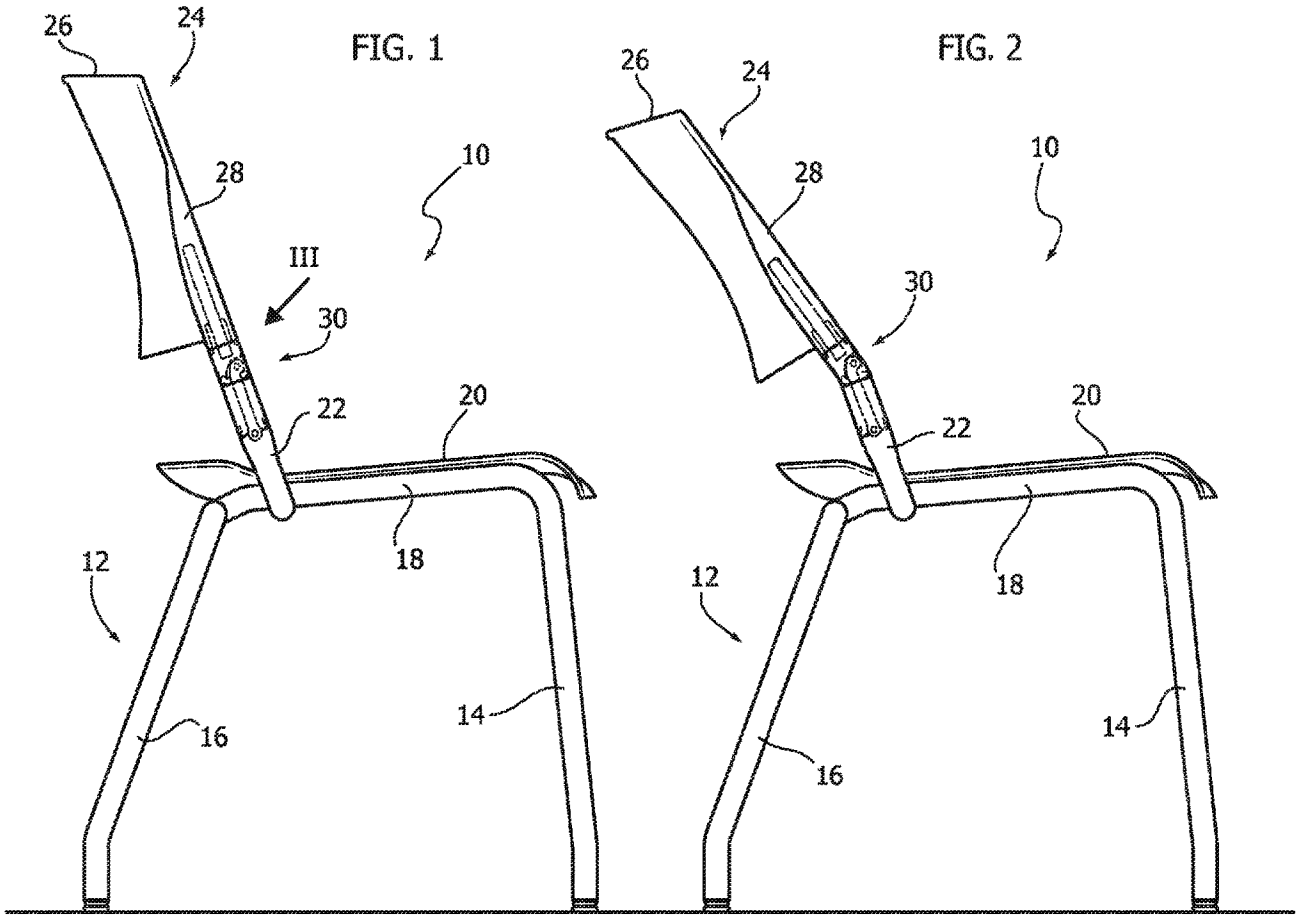
FIG. 1 is a side view of a chair according to the present invention in the rest position.
FIG. 2 is a side view corresponding to FIG. 1, illustrating the backrest in the backwardly-inclined position.

With reference to FIGS. 1 and 2, numeral 10 indicates a chair according to the present invention. The chair 10 comprises a fixed support structure 12 including a pair of front legs 14 and a pair of rear legs 16. The front legs 14 and the rear legs 16 are connected together by means of upper connecting elements 18. A seat 20 is fixed to the upper connecting elements 18 of the fixed support structure 12.

The fixed support structure 12 comprises two tubular side uprights 22 extending upwards. The two side uprights 22 are fixed with respect to the support structure 12. For example, the side uprights 22 can be fixed to the upper connecting elements 18.

The seat 10 comprises a backrest 24 pivotally connected to the fixed support structure 12. The backrest 24 comprises a backrest panel 26 having an arcuate shape, and two side portions 28 located laterally on opposite sides with respect to the backrest panel 26. The side portions 28 can be formed in a monolithic manner with the backrest panel 26. The side portions 28 of the backrest 24 are connected to the respective side uprights 22 of the fixed support structure 12 by means of respective elastic joints 30.

Figure 5:
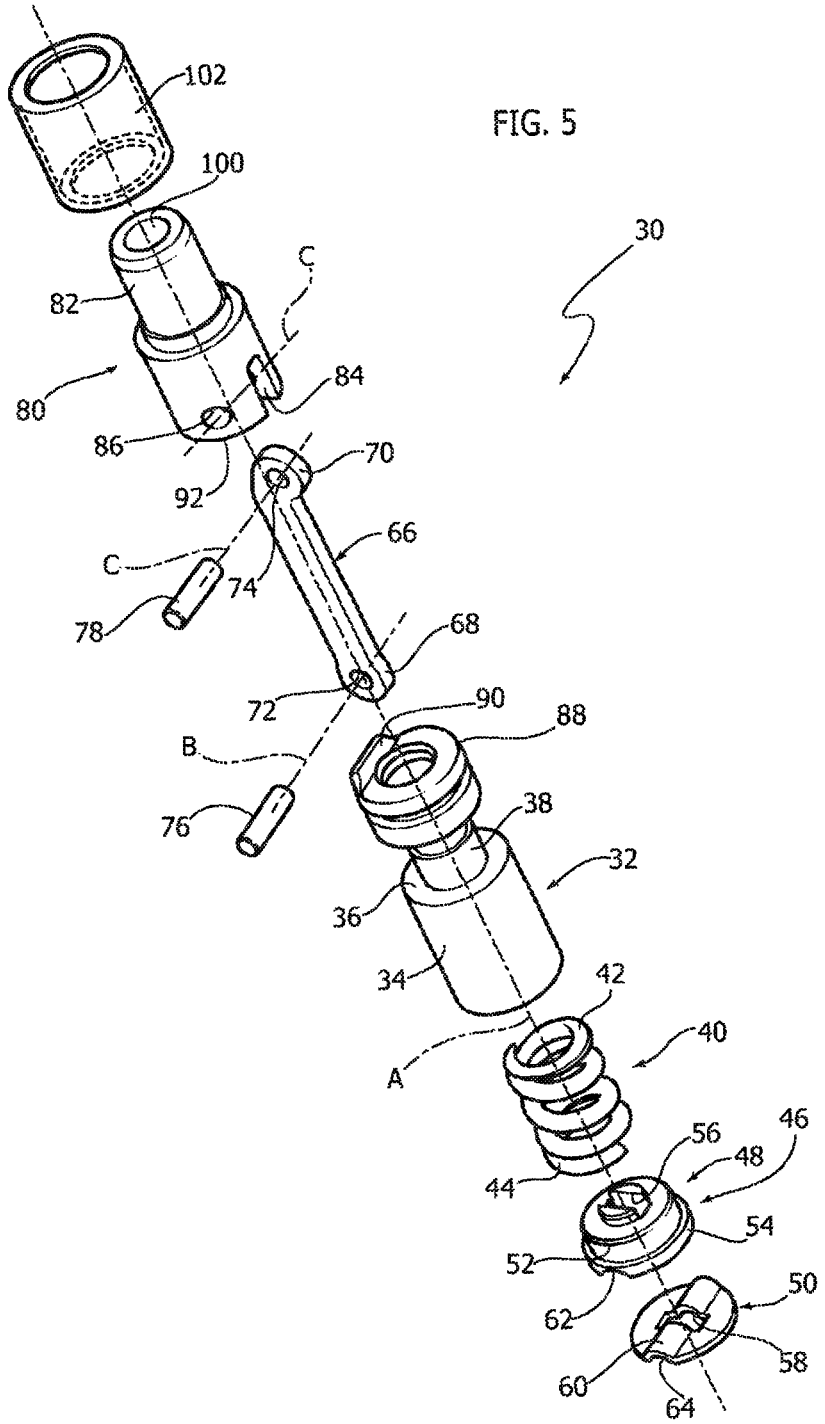
FIG. 5 is an exploded perspective view of certain components of the elastic joint indicated by the arrow III in FIG. 1.

With reference to FIG. 5, each elastic joint 30 comprises a bushing 32 having a cylindrical wall 34 having an open lower end and an upper end fitted with a front wall 36. The bushing 32 can be equipped with a projecting appendage 38 that projects upwards from the front wall 36.

The elastic joint 30 comprises a helical spring 40 housed within the cylindrical wall 34 of the bushing 32. The helical spring 40 has a longitudinal axis A coaxial to the axis of the cylindrical wall 34 of the bushing 32. The helical spring 40 has an upper end 42 and a lower end 44. The upper end 42 rests against the front wall 36 of the bushing 32. The lower end 44 of the helical spring 40 rests on a compression member 46. In the illustrated example, the compression member 46 comprises a body of plastic material 48 and a metal washer 50. The body of plastic material 48 has a cylindrical portion 52 that couples, in a sliding manner, with the lower end of the bushing 32. At the bottom of the cylindrical portion 52, a radially-projecting shoulder 54 is formed. The body 48 of the compression member 46 has a through hole 56 with a rectangular section. The washer 50 rests against a lower surface of the body 48. The washer 50 has a through hole 58 with a rectangular section aligned with the hole 56 of the body 48. Preferably, the washer 50 has a convex deformed portion 60 that couples with a corresponding concave seat 62 formed on the lower surface of the body 48. The washer 50 has a concave seat 64 on the surface opposite to the convex projection 60.

The elastic joint 30 comprises a rigid connecting rod 66 preferably made of metal. The connecting rod 66 preferably has a rectangular cross section. The connecting rod 66 has a lower end 68 and an upper end 70 equipped with respective holes 72, 74, engaged by respective pins 76, 78. The axes of the pins 76, 78, indicated with B and C, are parallel to each other, and transverse relative to the axis A of the spring 40.

The elastic joint 30 comprises an upper attachment 80 having a shank 82, which is fixed into a hole formed at the lower end of the respective side portion 28 of the backrest 24. The upper attachment 80 has a groove 84 into which the upper end 70 of the connecting rod 66 is inserted. The upper attachment 80 has a transverse hole 86, through which the upper pin 78 is inserted, which connects the upper end 70 of the connecting rod 66 to the upper attachment 80, in an articulated manner.

The elastic joint 30 is preferably provided with a ring of plastic material 88 fitted on the appendage 38 of the bushing 32. The ring 88 has a lower front surface, which rests on the front surface 36 of the bushing 32, and an upper surface 90 against which a lower surface 92 of the upper attachment 80 rests. As is illustrated in FIGS. 3 and 4, the upper surface 90 of the ring 88 and the lower surface 92 of the upper attachment 80 may have respective projecting and receding profiles in order to establish a shape coupling.

Figure 3:
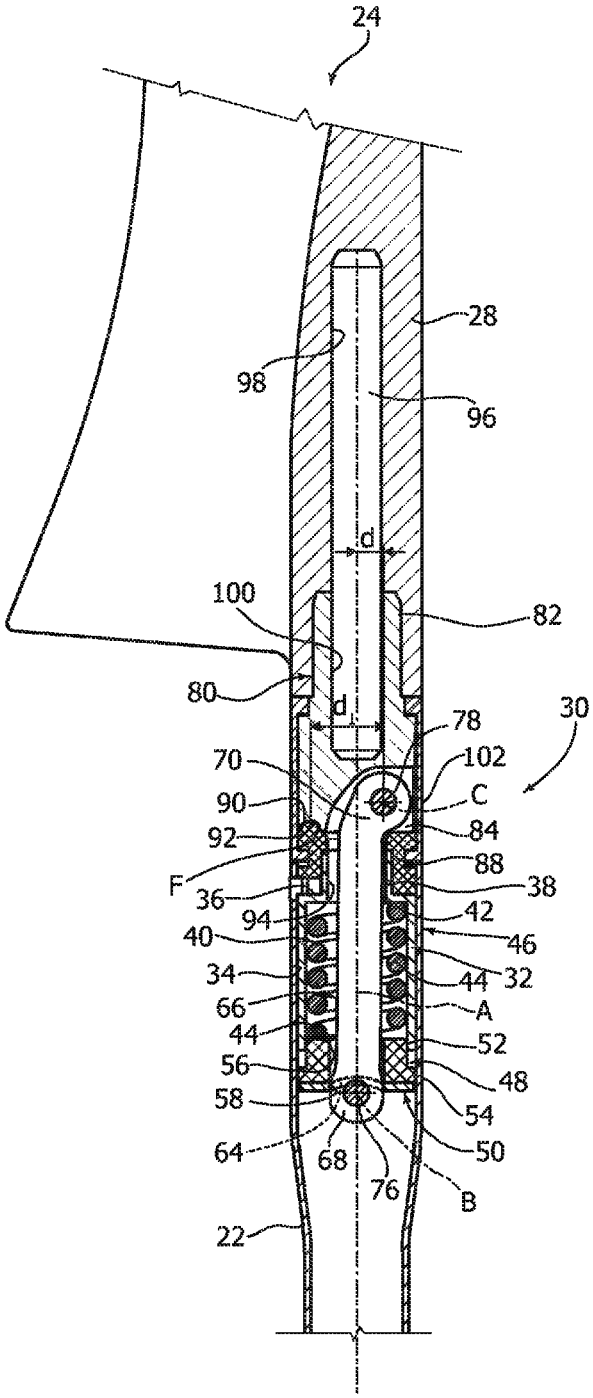
FIG. 3 is an axial section of the part indicated by the arrow III in FIG. 1 in the rest position.
Figure 4:
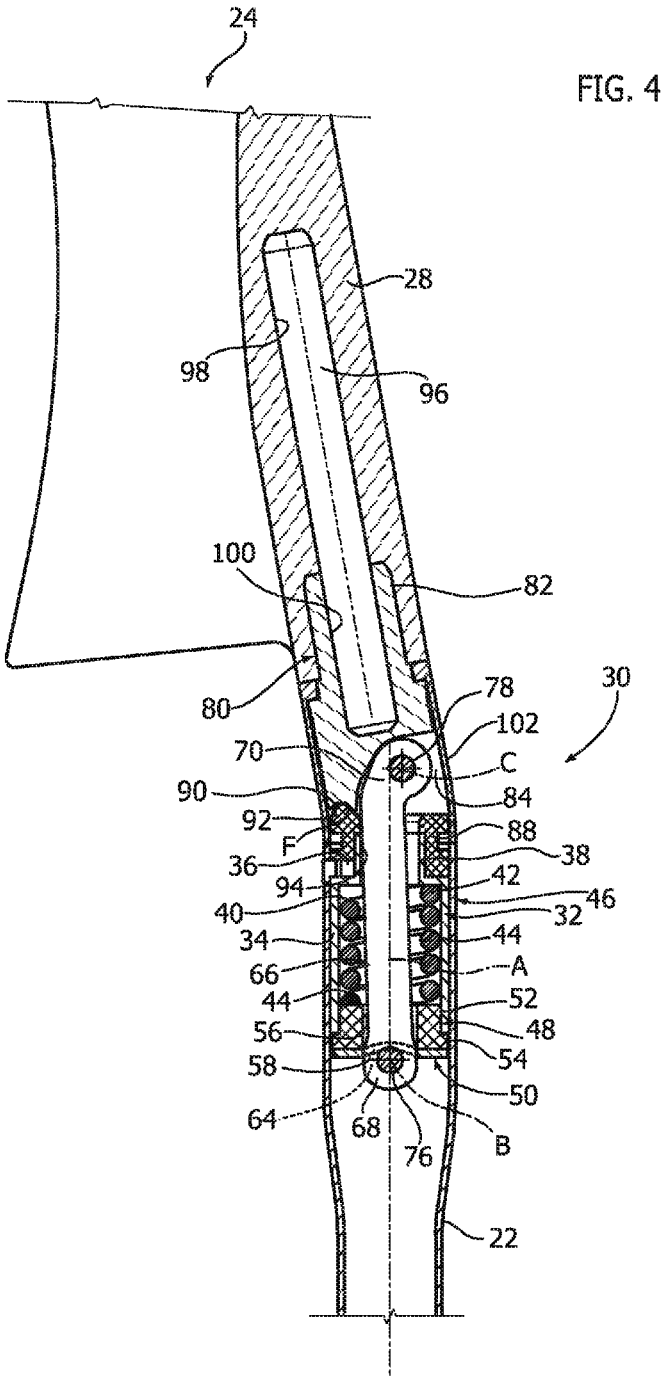
FIG. 4 is an axial section analogous to FIG. 3 in the position of maximum backward-inclination.

As is visible in FIGS. 3 and 4, the bushing 32 of each elastic joint 30 is fixed, for example by hammering, to the upper end of the corresponding tubular upright 22 of the fixed support structure 12.

The lower portion of the connecting rod 66 extends through the holes 56 and 58 of the body 48 and of the washer 50 of the compression member 46. The first pin 76 connects the lower end 68 of the connecting rod 66 to the compression member 46 in an articulated manner. The pin 76 is housed in the concave seat 64 of the washer 50. The central portion of the connecting rod 66 included between the ends 68, 70 extends through the helical spring 40 and through a through hole 94 formed in the upper part of the bushing 32.

The upper end 70 of the connecting rod 66 that projects above the ring 88 is bent forwards. In this way, the articulation axis C, between the upper end 70 of the connecting rod 66 and the upper attachment member 80, is moved forward by a distance d (FIG. 3) with respect to the longitudinal axis A of the spring 40. The articulation axis B of the lower end 68 of the connecting rod 66 of the compression member 46 is essentially located on the longitudinal axis A of the spring 40.

The effect of the forward displacement of the axis C with respect to the longitudinal axis A of the spring 40 is that of increasing, all other conditions being equal, the elastic torque applied by the springs 40 to the backrest 24. When a backward thrust is applied to the backrest 24 by the user's back, the upper attachment 80 pivots backwards about a fulcrum point, indicated with F in FIGS. 3 and 4. The fulcrum point F is defined by the point of mutual rotation between the contact surfaces of the upper attachment 80 and the ring 88. The rotation of the upper attachment 80 about the fulcrum point F compresses the spring 40 by means of the connecting rod 66. The return elastic force of the spring 40 has a lever arm of dimension d1, with respect to the pivot fulcrum F. The lever arm d1 is increased thanks to the forward displacement of the articulation axis C. Consequently, at a constant axial force exerted by the spring 40, thanks to the forward displacement of the articulation axis C, a higher torque on the backrest 24 is achieved, which counteracts the backward thrust applied by the user.

In the position of maximum backward inclination of the backrest, illustrated in FIG. 4, the radial shoulder 54 of the compression member 46 rest against the lower end of the bushing 32 and forms a stroke end, which prevents further backward inclination of the backrest.

To stiffen the fixing area between the side portions 28 of the backrest 24 and the corresponding upper attachments 80, each elastic joint 30 may be fitted with a stiffening pin 96 (FIGS. 3 and 4) having an upper portion driven into a hole 98 of the side portion 28 of the backrest 24, and a lower portion driven into a hole 100 of the respective upper attachment 80.

Each elastic joint 30 can also be fitted with an protective elastic element 102 arranged coaxially around the contact area between the upper attachment 80 and the ring 88, in order to avoid pinching of garments or parts of the body between the contact surfaces of the upper attachment 80 and the ring 88.

Of course, without prejudice to the principle of the invention, the details of construction and the embodiments may vary widely with respect to those described and illustrated without departing from the scope of the invention as defined by the following claims.

The invention claimed is:

1. A chair comprising:

a fixed support structure including two side uprights; a backrest having two side portions; and a pair of elastic joints connecting said side portions of the backrest to said side uprights, wherein each of said elastic joints comprises:

a bushing fixed to a respective side upright;

a helical spring having a longitudinal axis, the helical spring having an upper end resting against a front wall of the bushing;

a compression member resting against a lower end of the spring;

an upper attachment fixed to a corresponding side portion of the backrest; and a rigid connecting rod having an upper end and a lower end articulated, respectively, to the upper attachment and to the compression member about respective axes parallel to each other and transverse with respect to said longitudinal axis, wherein the articulation axis between the upper end of the connecting rod and the upper attachment of each elastic joint is spaced forward with respect to said longitudinal axis.

2. A chair according to claim 1, wherein each elastic joint comprises a ring of plastic material placed between said upper attachment and said bushing.

3. A chair according to claim 2, wherein said ring and said upper attachment have respective surfaces in contact with each other, and shaped in such a way as to establish a shape coupling.

4. A chair according to claim 2, wherein each of said elastic joints comprises a protective elastic element fitted on an area of contact between said upper attachment and said ring.

5. A chair according to claim 1, wherein said connecting rod has an upper end portion bent forward and housed in a grove of said upper attachment, the upper end of said connecting rod being articulated to the upper attachment by means of a pin.

* * * * *